B. P. WAGNER.
COVER FOR CULINARY AND LIKE VESSELS.
APPLICATION FILED AUG. 18, 1920.
1,409,262.
Patented Mar. 14, 1922.
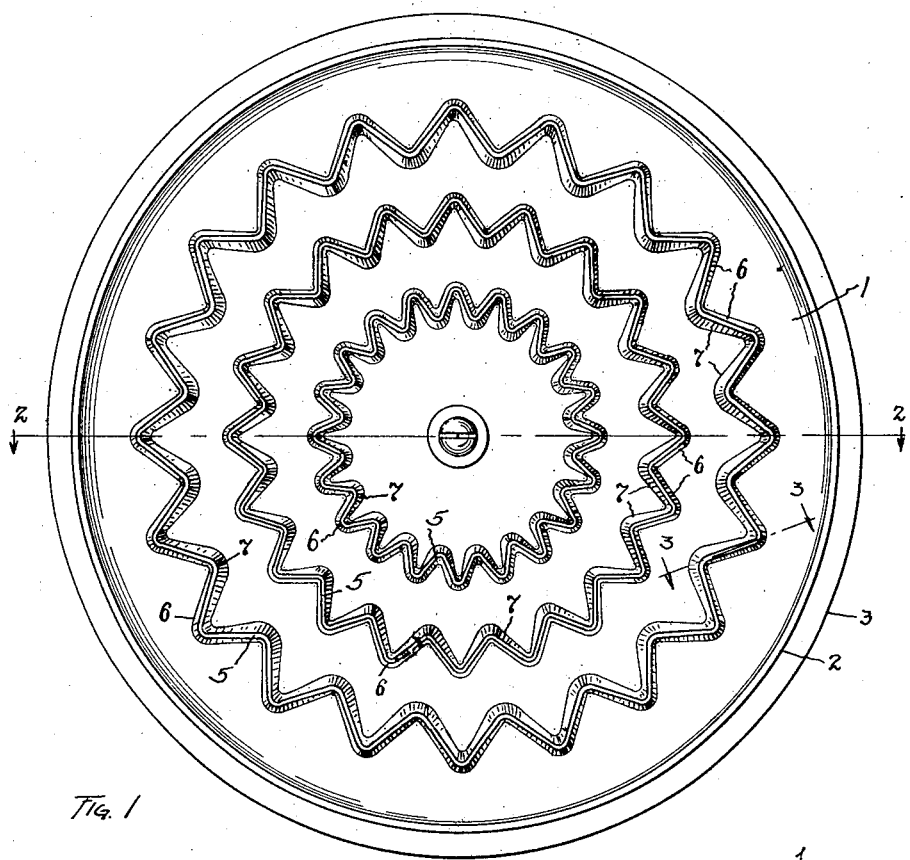
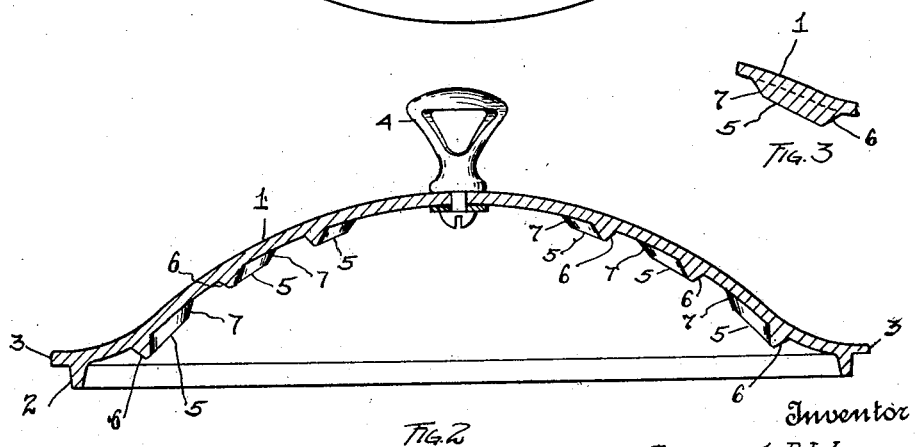
Inventor
Bernard P. Wagner
By Fay, Oberlin & Fay
Attorneys

UNITED STATES PATENT OFFICE.

BERNARD P. WAGNER, OF SIDNEY, OHIO, ASSIGNOR TO THE WAGNER MANUFACTURING COMPANY, OF SIDNEY, OHIO, A CORPORATION OF OHIO.

COVER FOR CULINARY AND LIKE VESSELS.

1,409,263.     Specification of Letters Patent.     Patented Mar. 14, 1922.

Application filed August 18, 1920. Serial No. 404,388.

*To all whom it may concern:*

Be it known that I, BERNARD P. WAGNER, a citizen of the United States, and a resident of Sidney, county of Shelby, and State of Ohio, have invented a new and useful Improvement in Covers for Culinary and like Vessels, of which the following is a specification, the principle of the invention being herein explained, and the best mode in which I have contemplated applying that principle, so as to distinguish it from other inventions.

The object of the present invention is to provide a cover for a cooking pot, roasting pan, Dutch oven, or similar culinary utensil used for steam cooking, basting, roasting and the like, which will control the condensation of steam so as to cause the condensate to drop evenly over the entire area of the utensil, instead of being localized, as is the case with covers as usually designed.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a bottom plan view of a cover embodying my present improved features of construction; Fig. 2 is a central vertical section of the same, taken on the plane indicated by the line 2—2, Fig. 1; and Fig. 3 is a similar section of a detail taken on the plane indicated by the line 3—3, Fig. 1.

It has not been deemed necessary, for the purpose in hand, to illustrate the vessel or utensil to which the cover is intended to be applied, and it is equally a matter of indifference how the cover be thus applied, whether loosely or locked thereto by suitable securing means, such as are more especially employed in connection with Dutch ovens, for example. The cover 1 as shown is of general concavo-convex form, i. e. dome-shaped, with the concave face directed downwardly, and is provided with an annular depending flange or rib 2, leaving a shoulder 3 to rest upon the top of the utensil. The cover is also provided with a handle 4 as usual.

It is to the conformation of the interior concave face of the cover that attention is particularly directed. As clearly shown in Fig. 1, such face is provided with a series of concentric ribs 5, preferably formed integral with the interior of the cover, although they may be separately attached if desired. It will also be understood that although three such ribs are thus shown, any number from one up, depending upon the size of the cover and other conditions, may be employed. As also clearly shown in Fig. 1, these ribs, while of general circular form, concentrically disposed with respect to each other, where more than one are employed, are corrugated so as to present a series of outwardly and inwardly directed angles 6 and 7, respectively, such angles being preferably aligned in a radial direction in the successive ribs. The portions of the ribs entering into such outwardly directed angles 6 are preferably of greater depth than the portions entering into such inwardly directed angles 7, as shown in Figs. 2 and 3.

As a result of the construction just described, the water of condensation or condensate, instead of being allowed to run down the cover to the flange 2, and then dripping down around the sides of the vessel upon which the cover is placed, is caught by the inclined portions of the successive ribs 5 such portions joining in the V-shaped projections or outwardly directed angles 6, and, due to the inclination of these angles, such condensate is collected at their points in a series of drops uniformly all around the circumferential extent of each rib. As these drops collect and become sufficiently heavy, they drip off onto the meat or other article being cooked, and obviously are similarly uniformly distributed over the latter. There is thus kept up a constant basting operation during the cooking, such basting being automatically accomplished, and reducing to a minimum the amount of hand basting necessary.

It will be understood that the cover may be of oval or oblong shape, instead of strictly circular as shown, and that the ribs 5 in such case will conform with the outline of the cover, the object being that each rib will lie in a plane parallel with the lower edge or flange 2 of the cover.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. As an article of manufacture, a cover for cooking utensils and the like having a concave under surface formed with a series of circumferentially spaced individual-drop forming rib-portions inclined relatively to radial lines passing therethrough.

2. As an article of manufacture, a cover for cooking utensils and the like having a concave under surface formed with a series of circumferentially spaced individual-drop forming rib-portions inclined relatively to radial lines passing therethrough, adjacent rib-portions being joined to form outwardly directed V-shaped projections or angles.

3. As an article of manufacture, a cover for cooking utensils and the like having a concave under surface formed with a series of circumferentially spaced individual-drop forming projections and ribs converging thereon, respectively, said ribs lying radially inwardly with respect to said projections.

4. As an article of manufacture, a cover for cooking utensils and the like having a concave under surface and rib projecting from such surface, such rib being corrugated and the points thereof constituting individual-drop forming projections, substantially as described.

5. As an article of manufacture, a cover for cooking utensils and the like having a concave under surface and rib projecting from such surface, such rib being formed with angles directed radially outwardly and constituting individual-drop forming projections.

6. As an article of manufacture, a cover for cooking utensils and the like having a concave under surface and rib projecting from such surface, such rib being formed with a succession of radially outwardly and inwardly directed angles, the former whereof constitute individual-drop forming projections.

7. As an article of manufacture, a cover for cooking utensils and the like having a concave under surface and rib projecting from such surface, such rib being formed with a succession of radially outwardly and inwardly directed angles, and such outwardly directed angles being of greater depth than those directed inwardly and constituting individual-drop forming projections.

8. As an article of manufacture, a cover for cooking utensils and the like having a concave under surface and a plurality of concentric ribs projecting from such surface, such ribs being formed with a succession of radially outwardly directed angles constituting individual-drop forming projections.

9. As an article of manufacture, a cover for cooking utensils and the like having a concave under surface and a plurality of concentric ribs projecting from such surface, such ribs being formed with a succession of radially outwardly directed angles constituting individual-drop forming projections and such angles being radially aligned in successive ribs.

Signed by me, this 6th day of July, 1920.

BERNARD P. WAGNER.